United States Patent Office 3,356,536
Patented Dec. 5, 1967

3,356,536
FUEL CELL ELECTRODES COMPRISING MIXTURES OF SILVER, NICKEL, MOLYBDENUM AND NICKEL-PHOSPHORUS ALLOYS AND METHOD OF MAKING SAME
Henry J. Seim, Brookfield, James P. Murdock, West Allis, and Theodore L. Larson, Milwaukee, Wis., assignors to Allis-Chalmers Manufacturing Company, Milwaukee, Wis.
No Drawing. Filed Oct. 22, 1965, Ser. No. 502,590
5 Claims. (Cl. 136—86)

This invention relates to improved anode catalysts for activating fuel half-cell reactions within fuel cells. More particularly, this invention deals with fuel cell anodes comprising mixtures of silver, nickel, molybdenum and nickel-phosphorus alloys than electrochemically activate fuel cell fuels such as hydrogen, hydrazine, ammonia; and alcohols, esters, carboxylates, hydrocarbons, and carbonyl compounds of up to about 14 carbon atoms.

The term fuel cell, as used herein, refers to those electrochemical devices that convert the free energy of a chemical reaction directly to electrical energy. Such devices are well known in the art and although there are differences between various cells, a discussion of some of their common characteristics and problems will aid in the understanding of our invention.

As is known, oxidation-reduction reactions are accompanied by the transfer of electrons from the reductant to the oxidant. In individual fuel cells, the oxidation reaction and reduction reaction take place at spacially separated electrodes. At each electrode there occurs what is called a half-cell reaction. One electrode, called the anode, is the site of the oxidation half-cell reaction. A reactant, referred to as the fuel, that is oxidizable with respect to some oxidant is supplied by suitable means to the anode, and is thereat electrochemically oxidized. Oxidation of the fuel releases electrons to the anode. At the other electrode, called the cathode, spaced apart from the anode by a suitable electrolyte, the other half-cell reaction simultaneously takes place. A reactant called the oxidant, reducible with respect to the fuel, is supplied by suitable means to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through electrolyte. The current produced in the external circuit can do useful work. Production of current will continue so long as fuel and oxidant are supplied and waste products exhausted.

The voltage of the individual fuel cell is limited by the theoretical free energy change ($\Delta F$.) for the reaction at the fuel cell operating temperature. The amperage of the cell is determined by the rate of reaction and the size of the cell. In practice, several individual fuel cells are coupled in cooperative electrical connection to obtain the desired output. A plurality of cells so connected is known as a module.

Although the reaction between oxidant and fuel is thermodynamically spontaneous, in cells operated at less than about 95° C., a catalyst is necessarily employed to bring the reactants to an activated state. The energy input required to reach an activated state, i.e. heat of activation, partly determines the speed of reaction. Through a mechanistic bypass a catalyst brings about reaction with a smaller heat of activation.

Nickel electrodes have found extensive use as anodes in fuel cells having a caustic electrolyte. In so-called low temperature operation efficiency demands that the porous nickel electrode base carry a deposit of a catalyst such, for example, as platinum group metals and oxides of the transition series elements upon its surface.

We have discovered, as disclosed in co-pending United States patent application Ser. No. 430,726, filed Feb. 5, 1965, that when anodes comprise, in addition to nickel, a nickel-phosphorus alloy, the outputs generated by such electrodes exceed those obtained when only nickel is used.

The new and improved electrode we have discovered is disclosed in the following specification and claims comprising silver and molybdenum in addition to nickel and nickel-phosphorus alloys. Silver has heretofore nearly exclusively been used and regarded as an oxidant catalyst. We find that if molybdenum is co-precipitated with the silver, nickel and nickel-phosphorus alloys a catalytic material superior to that disclosed in our earlier referred to patent application is obtained.

Hence, the general object of our invention is the provision of a catalytic fuel cell electrode.

A further object of our invention is to provide a method of obtaining a fuel cell electrode of high surface area that comprises silver, molybdenum, nickel, and nickel-phosphorus alloys.

A still further object of our invention is to provide a fuel cell electrode that exhibits extraordinary high outputs compared to previously known nickel electrodes.

The methods by which the catalytic material, as it is referred to hereinafter, of our invention are attained will now be set forth in detail.

We have discovered that the catalytic material can be best obtained by reduction from an aqueous solution comprising a reducible source of molybdenum; a reducible source of nickel; a condensed polyphosphate that complexes nickel ions ($Ni^{++}$) in aqueous solution; and alkali hypophosphite; and a reducible source of silver. During the performance of the reduction procedure the pH of the solution ought constantly to be controlled so as to be above $pH_{10}$ and preferably in the pH range of 10 to 12. To achieve control, sufficient hydroxyl ions are added as an alkali hydroxide, or better yet, as ammonium hydroxide.

The source of the molybdenum is preferably a water soluble molybdenum compound leaving Mo in the $+2$ to $+6$ oxidation state. Examples of suitable molybdenum compounds are $MoO_3$, $MoCl_2$ and $MoCl_5$. The quantity of molybdenum salt present is adjusted so that the material precipitated contains from about 2% to 9% molybdenum.

The following reaction illustrates the reduction of the molybdenum ion from the $+6$ oxidation state to the material that we use in our catalytic mixture:

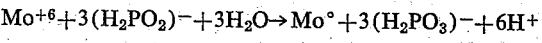

$$Mo^{+6} + 3(H_2PO_2)^- + 3H_2O \rightarrow Mo^\circ + 3(H_2PO_3)^- + 6H^+$$

As a source of reducible nickel any water soluble nickelous salt is suitable provided its anion does not interfere with the reduction process by itself either precipitating or undergoing a redox reaction. We find that nickel sulfate works quite well.

The nickel ions are reduced by the alkali hypophosphite according to the following reaction:

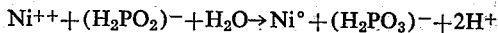

$$Ni^{++} + (H_2PO_2)^- + H_2O \rightarrow Ni^\circ + (H_2PO_3)^- + 2H^+$$

Likewise as a source of reducible silver, any water soluble silver salt is suitable provided its anion does not interfere with the reduction process by itself either precipitating or undergoing a redox reaction. Again we find that the sulfate salt is quite suitable.

The silver is reduced by the hypophosphite according to the following reaction:

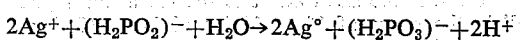

$$2Ag^+ + (H_2PO_2)^- + H_2O \rightarrow 2Ag^\circ + (H_2PO_3)^- + 2H^+$$

The silver is thought to be formed in a finely divided state perhaps even colloidal, thereby providing a nuclei for the catalytic reduction of the nickel.

Of course once the reaction is underway some of the freshly formed Ni° can reduce the Ag+ to Ag° thereby providing additional catalyst for the hypophosphite reduction of nickel.

The quantity of silver salt present in the solution as expressed in moles Ag ought not to exceed about half the quantity of nickel salt present expressed in moles Ni. For example, when using the sulfate salts we find that the maximum useful amount of Ag+ is 0.55 mole per mole of Ni++.

Simultaneously, to the reduction of Ni++, Ag+ and Mo ion some of the hypophosphite is decomposed. This decomposition is catalyzed by presence of the freshly reduced nickel and silver proceeding as follows:

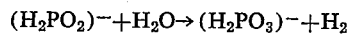

$$(H_2PO_2)^- + H_2O \rightarrow (H_2PO_3)^- + H_2$$

Therefore, the necessity of providing an excess of hypophosphite over and above that stoichiometrically required to reduce all the nickel, silver and molybdenum is apparent. If insufficient hypophosphite is provided, no harm is done except that not all the nickel, silver and molybdenum will be reduced.

We find that if 2.75 moles of $(H_2PO_2)^-$ are present per combined total moles of Mo ion, Ni++, and Ag+, the reaction can proceed to completely deplete the solution of Mo ion, Ni++, and Ag+.

The function of the condensed phosphate is to complex the nickel so that precipitation of basic nickel salts is prevented when the pH is adjusted upward by the addition of hydroxyl ion. Therefore, to this end, any condensed polyphosphate that performs the complexing function is suitable. Whatever condensed polyphosphate is used, it should be present in an amount sufficient to complex all the Ni++ present and prevent the precipitation of basic nickel salts. It is not a certainty from our experimental work and the literature that the molybdenum ion is actually complexed by the polyphosphate.

When alkali pyrophosphate is used as the complexing agent, an amount of at least 1.00 mole of $P_2O_7^{--}$ for each 1.45 moles of Ni++ is deemed the minimum pyrophosphate required for successful complexing of the nickel. Preferably 1.18 mole $P_2O_7^{--}$ is present for each 1.00 mole Ni++. While pyrophosphates can of course hydrolyze and form orthophosphates, this is not material to the performance of the process, because the nickel is reduced before the relatively slow hydrolysis becomes a serious problem.

Turning now to a specific embodiment of the practice of our invention, we shall outline the production of a batch of our catalytic material.

An aqueous solution having the following composition was prepared by admixing 30 grams $Na_4P_2O_7$; 25 grams $NiSO_4 \cdot 6H_2O$; 2 grams $AgSO_4$; 25 grams $NaH_2PO_2 \cdot H_2O$ and 1 gram $MoO_3$ per liter of water heated to about 60° to about 65° C., although the reduction can be carried out satisfactorily at temperatures from 52° to 82° C. The pH was kept in the range 10 to 12 at all times by the addition of 29% $NH_4OH$. A vigorous reaction took place with the evolution of hydrogen gas.

A more thorough understanding of our invention can be gained through the following example illustrating the preparation of a 75 liter batch.

Seventy-five liters of water was heated to a temperature of 62 degrees centigrade, being vigorously stirred before, during and after the autocatalytic decomposition reaction by means of five three-bladed polyethylene propeller-type, motor-driven stirrers. To adjust the pH, 0.75 liter of aqueous 29% ammonium hydroxide was added. After adjusting the pH 2.24 kg. of tetrasodium pyrophosphate was dissolved in the hot water and the pH again adjusted to fall in the range of 11 to 12 by adding 0.75 liter of aqueous 29% ammonium hydroxide. Then 75 grams of molybdenum trioxide are dissolved together with 1.88 kg. of nickelous sulfate was then dissolved in the hot solution and the pH again adjusted to fall in the range of 11 to 12 by adding 3 liters of aqueous 29% ammonium hydroxide. Then, 0.15 kg. of silver sulfate was dissolved in the hot solution. At this point the solution was clear and had a bluish-green color; 1.88 kg. of sodium hypophosphite was then added. In approximately one or two minutes the evolution of hydrogen began. Two minutes after the addition of the sodium hypophosphite, another 6.3 liters of aqueous 29% ammonium hydroxide was added. The pH was now in the range of 11 to 12.

After about another four minutes the autocatalytic decomposition reaction became very vigorous and a large amount of nascent hydrogen was liberated from the solution. The solution changed color from bluish-green to black because of the formation of the flocculent black nickel-silver-phosphorus-Mo product.

When the reaction began to subside, an additional 223.8 grams of tetrasodium pyrophosphate and an additional 187.5 grams of sodium hypophosphite was added. This assured completeness of the reaction and complete depletion of the reducible nickel and silver ion content of the solution. The autocatalytic decomposition reaction was complete after about twenty minutes.

It is very important that during these twenty minutes the pH is maintained in the range of 11 to 12 by adding an excess of aqueous 29% ammonium hydroxide. The total amount of aqueous 29% ammonium hydroxide added is equal to about 14% of the total hot water volume. The product was a finely divided, high surface area powder which contains about 53% nickel, 22% silver, 1% phosphorus and 7% molybdenum producing about 460 grams of the powdery nickel, silver, molybdenum and nickel-phosphorus alloy product.

The precipitate of catalyst material is collected and washed with water. The phosphorus content of this catalytic material is variable. Usually, the phosphorus content of the catalyst product is within the range of about 0.6 to 2.24% phosphorus by weight, the remainder being molybdenum, nickel, and silver. The silver can vary from about 6.75 to 25.4% by weight, the nickel can vary from about 43.6 to 78.4% by weight, and the molybdenum can vary from about 6 to 8.5% by weight.

It will be apparent to one skilled in the art that the concentrations of the various starting materials can be varied by experimentation to produce a composition having percentages within these ranges. The specific surface area of our catalyst prior to fabricating, also is variable within the range of 6.7 to somewhat in excess of about 25.7 meters 2/gram.

The washed catalytic material is now ready to be shaped into a form suitable for installation into a fuel cell. Most fuel cell designs require the electrode to assume the form of a thin sheet. Other fuel cells require forms such as cylinders which too can be satisfactorily made from our material. The ultimate shape of the electrode depends not on our catalytic material but rather on the design of the individual cell.

Any suitable fabricating technique can be used to stabilize our catalyst in the desired shape, even sintering provided the catalytic material is not heated to a temperature in excess of 825 to 850° C. Heating to a higher temperature causes the nickel-phosphorus phases present as alloys to begin to melt. Melting results in a decreased surface area.

Other suitable means for forming our catalyst product into a fuel cell electrode include mixing it with a binding agent such as a thermoplastic resin; for example, polytetrafluoroethylene. The catalyst resin mixture is then shaped and heated until the thermoplastic material softens slightly to thereby stabilize the electrode.

An especially desirable means for stabilizing the catalytic material into an electrode shape was found to be as follows. The catalytic material was mixed with a small amount of asbestos fiber in an aqueous slurry; for example, 40 grams of catalyst to 0.5 gram asbestos fiber in 200 ml. water.

The catalyst asbestos mixture was then poured into a Buchner funnel fitted with filter paper. The water was removed by suction, leaving a damp matte. Care was taken to assure a uniform thickness of the matte.

The matte together with the filter paper was removed from the Buchner funnel and a nickel support screen pressed lightly into the matte. This assembly was dried in a partial vacuum (25 mm. Hg) at 60° C.

When completely dry, the electrode was trimmed to size and installed as the anode in a fuel cell operated at a reactant supply pressure of 18 p.s.i.g.; hydrogen fuel; oxygen oxidant, a silver cathode; an aqueous potassium hydroxide electrolyte concentration between 35 and 40% KOH by weight and a temperature of about 90° C. At 100 amps/ft.$^2$ the cell voltage varied between 0.81 and 0.86 volt.

The embodiments of the invention in which an exclusive property or privilege is claimed are defined as follows:

1. The method of producing a catalytic fuel cell electrode comprising the steps of preparing a solution consisting essentially of a dissolved nickelous salt and a dissolved silver salt having a silver ion concentration not exceeding 0.55 mole $Ag^+$ per mole of $Ni^{++}$, a molybdenum salt in which molybdenum is in an oxidation state of from +2 to +6 in a quantity sufficient so that the finished catalytic material contains from 6 to 8.5% molybdenum by weight, a dissolved alkali pyrophosphate having at least 1.00 mole of $P_2O_7^{--}$ for each 1.45 moles combined total of $Ag^+$ and $Ni^{++}$; a dissolved alkali hypophosphite having in excess of 2.75 moles of $(H_2PO_2)^-$ for each 1.00 mole of $Ni^{++}$; and maintaining the pH of said solution in excess of pH 10 through addition of ammonium hydroxide; reacting said solution with the hypophosphite of said alkali hypophosphite thereby reducing said nickelous, molybdenum, silver ions to a flocculant precipitate of catalytic material, said catalytic material consisting essentially of nickel, molybdenum, silver and nickel-phosphorus alloy; collecting the catalytic material; and fabricating the catalytic material into a fuel cell electrode.

2. The method of producing a catalytic fuel cell electrode comprising the steps of preparing an aqueous solution consisting essentially of a dissolved nickelous salt and a dissolved silver salt having a silver ion concentration not exceeding 0.55 mole $Ag^+$ per mole of $Ni^{++}$, a molybdenum salt in which molybdenum is in an oxidation state of from +2 to +6 in a quantity sufficient so that the finished catalytic material contains from 6 to 8.5% molybdenum by weight, an alkali hypophosphite, and a condensed nickel complexing polyphosphate in a quantity sufficient to prevent precipitation of basic nickel salts; maintaining the pH of said solution in excess of 10; reacting said silver and nickelous ions with the hypophosphite of said alkali hypophosphite; reducing said silver, molybdenum and nickelous ion to a flocculant precipitate of catalytic material consisting essentially of molybdenum, nickel, silver, and nickel-phosphorus alloy; collecting the catalytic material; and fabricating the catalytic material into a fuel cell electrode.

3. The method of producing a catalytic fuel cell electrode comprising the steps of preparing an aqueous nickelous and silver ion solution by admixing water, a nickelous salt, a silver salt, a molybdenum salt in which molybdenum is in an oxidation state of from +2 to +6 in a quantity sufficient so that the finished catalytic material consists of from 6 to 8.5% molybdenum by weight, an alkali hypophosphite, a condensed nickel complexing polyphosphate in a quantity sufficient to prevent precipitation of basic nickel salts; and sufficient hydroxide selected from the group consisting of the alkali and amonium hydroxides to maintain the pH of said solution between 10 and 12; reacting said molybdenum, nickelous, and silver ions with the hypophosphite of said alkali hypophosphite, reducing said molybdenum, nickelous, and silver ions to a flocculant precipitate of catalytic material, said catalytic material consisting essentially of molybdenum and nickel-phosphorus alloy; collecting the catalytic material; and fabricating the catalytic material into a fuel cell electrode.

4. A fuel cell electrode comprising a catalyst consisting essentially of from about 6.75 to 25.4 weight percent silver, from about 6.0 to 8.5 weight percent molybdenum, from about 43.6 to 78.4 weight percent nickel and from about 0.6 to 2.24 weight percent phosphorus.

5. A fuel cell having a housing; two electrodes mounted in said housing in spaced relation to each other; means to supply a fuel to one of said electrodes; means to supply an oxidant to the other of said electrodes; an electrolyte disposed between said electrodes; and at least one of said electrodes consisting of an electrically conductive porous support having randomly dispersed thereover and in the pores thereof a catalyst consisting essentially of from about 6.75 to 25.4 weight percent silver, from about 6.0 to 8.5 weight percent molybdenum, from about 43.6 to 78.4 weight percent nickel and from about 0.6 to 2.24 weight percent phosphorus.

No references cited.

ALLEN B. CURTIS, *Primary Examiner.*

WINSTON A. DOUGLAS, *Examiner.*

A. SKAPARS, *Assistant Examiner.*